United States Patent
Beechie et al.

[11] Patent Number: 6,055,971
[45] Date of Patent: May 2, 2000

[54] PLATEAU LINEARIZATION CURVES WITH PROPORTIONAL/INTEGRAL/DERIVATIVE CONTROL THEORY

[75] Inventors: Brian E. Beechie, Bolton, Canada; Kenneth P. DeGroot, Macomb Township, Mich.

[73] Assignee: Chrysler Corporation, Auburn Hills, Mich.

[21] Appl. No.: 09/119,906

[22] Filed: Jul. 21, 1998

[51] Int. Cl.⁷ .................................................. F02M 25/00
[52] U.S. Cl. ....................................... 123/680; 123/339.19
[58] Field of Search ................................ 123/680, 339.19

[56] References Cited

U.S. PATENT DOCUMENTS

| | | |
|---|---|---|
| 3,935,851 | 2/1976 | Wright et al. . |
| 4,048,964 | 9/1977 | Kissel . |
| 4,400,913 | 8/1983 | Krantz et al. . |
| 4,633,148 | 12/1986 | Prucher . |
| 4,791,826 | 12/1988 | Behrens . |
| 4,806,901 | 2/1989 | Glover . |
| 4,807,478 | 2/1989 | Betterton et al. . |
| 4,895,122 | 1/1990 | Noguchi et al. ........................ 123/680 |
| 4,905,299 | 2/1990 | Ferraiuolo et al. . |
| 4,966,112 | 10/1990 | Shimomura ............................. 123/680 |
| 5,070,837 | 12/1991 | Nishimura et al. ................ 123/339.19 |
| 5,381,074 | 1/1995 | Rudzewicz et al. . |
| 5,415,143 | 5/1995 | Tagai ................................... 123/339.19 |
| 5,542,313 | 8/1996 | McCarthy . |
| 5,615,660 | 4/1997 | Iwano et al. ............................ 123/680 |
| 5,666,810 | 9/1997 | Miesterfeld et al. . |
| 5,704,582 | 1/1998 | Golembiewski et al. . |
| 5,720,265 | 2/1998 | Maki et al. ............................. 123/680 |
| 5,765,528 | 6/1998 | Kamimaru .......................... 123/339.19 |
| 5,774,822 | 6/1998 | Maki et al. ............................. 123/680 |

*Primary Examiner*—John Kwon
*Attorney, Agent, or Firm*—Mark P. Calcaterra

[57] ABSTRACT

A proportional/integral/derivative control system is provided for controlling the operating parameters of a feedback system according to the difference between a measured value from a component of the system and a target set point. The control system employs a linearization curve having a plateau portion near the target set point. As the measured value approaches the target set point, smaller corrective measures are employed to minimize overshooting and fluctuations. Also, a range is established about the set point wherein no corrective measures are performed.

16 Claims, 2 Drawing Sheets

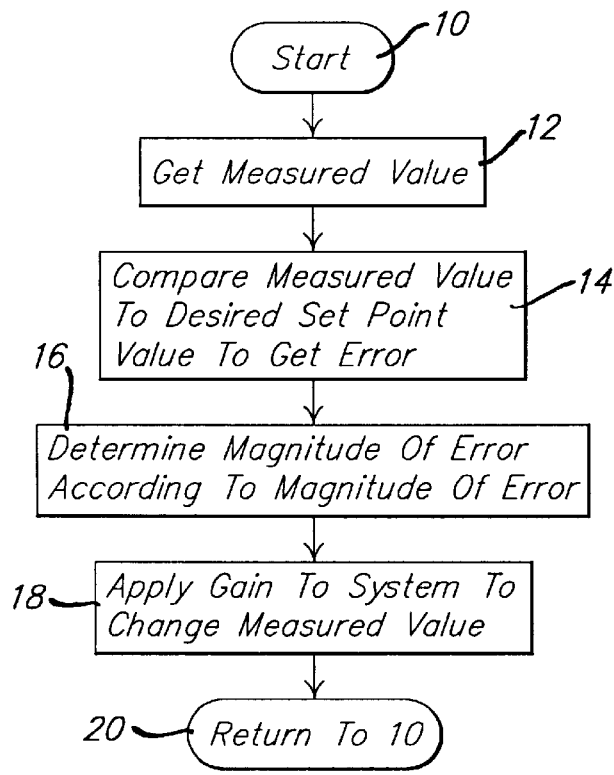
FIG. 1.
| Error (26) | Gain (24) |
|---|---|
| −1.0 | −4 |
| −0.75 | −2.75 |
| −0.5 | −0.75 |
| −0.25 | 0 |
| 0 | 0 |
| 0.25 | 0 |
| 0.5 | 0.75 |
| 0.75 | 2.75f |
| 1 | 4 |
FIG. 3.
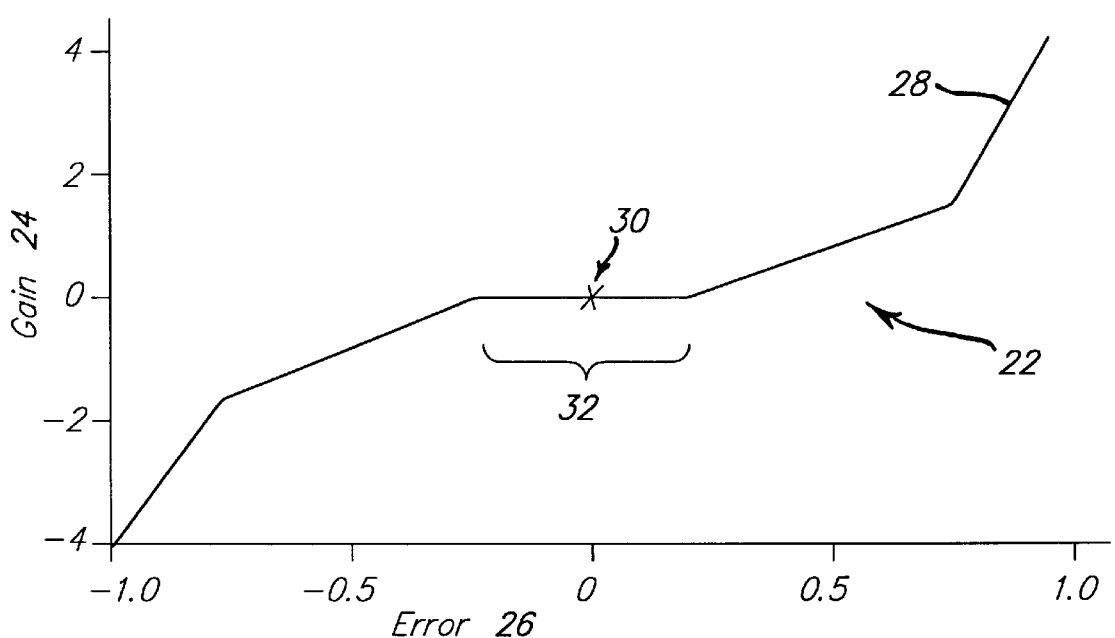
FIG. 2.

PLATEAU LINEARIZATION CURVES WITH PROPORTIONAL/INTEGRAL/DERIVATIVE CONTROL THEORY

BACKGROUND OF THE INVENTION

1. Technical Field

The present invention relates generally to control systems and, more particularly, to a control system for a motor vehicle utilizing proportional/integral/derivative control in conjunction with linearization curves.

2. Discussion

In many control systems, it is desirable to force a process variable to a predetermined set point. For instance, idle speed control and emission control in motor vehicles are examples of feedback control systems which maintain a process variable at a desired set point. According to these processes, an error value is determined by comparing measured values to the desired set point. The measured value is the output of feedback from a system component. Thereafter, a controller is responsive to the error value to control at least one operating parameter of the process to reduce the error value. By controlling the system component according to the measured value, the measured value is changed. Continuing the closed loop control process forces the measured value to the set point.

According to the prior art, proportional/integral/derivative (PID) control theory is utilized in combination with linearization curves. The linearization curve is generated according to theoretical and experimental test data generated for the operating environment in which the control system is to be employed. As illustrated in FIG. 6, prior art linearization curves are generally broken down into three portions. A first steeply sloped portion 100, a second moderately sloped portion 102, and a third steeply sloped portion 104. The target set point 106 is selected along the moderately sloped portion 102 of the linearization curve according to design needs. If the measured value from the application in which the control system is used falls within either the first or third steeply sloped portions 100, 104, the measured value is outside of the acceptable range for the process operating parameters. Therefore, massive corrections to the operating parameters are required to bring the measured value to a location along the second moderately sloped portion 102. These correction techniques are well known in the art and are not the subject of the present application. On the other hand, if the measured value falls along the moderately sloped portion 102 of the linearization curve, less massive corrective measures may be implemented to vary the operating parameters such that the measured value moves to the target set point 106.

According to the prior art, the same corrective measures are implemented for a measured value falling anywhere along the moderately sloped portion 102 of the linearization curve despite its proximity to the desired set point 106. As such, even a measured value which is close to the target set point 106 causes aggressive corrective processing by the control system. This causes overshooting of the target set point 106 which requires further corrections. Overshooting and re-correcting results in large fluctuations of the operating parameters and the measured value oscillates around the target set point 106.

In view of the foregoing, it would be desirable to provide a control system which tailors the magnitude of the corrective measures as the measured value approaches the target set point and implements no corrections when the measured value is within a preselected range of the target set point.

SUMMARY OF THE INVENTION

The above and other objects are provided by a proportional/integral/derivative control system utilizing a linearization curve having a plateau portion near the target set point. The linearization curve employed in the present invention utilizes four portions, a first steeply sloped portion, a second moderately sloped portion, and third plateau portion, and a fourth steeply sloped portion. Aggressive corrective techniques are used if the measured value falls within the first or fourth steeply sloped portions of the linearization curve. However, when the measured value falls along the second moderately sloped portion or the plateau portion, more moderate corrective measures are implemented. Furthermore, as the measured value approaches the target set point, correspondingly smaller corrective measures are employed thereby minimizing overshooting and fluctuations. Also, a range is established near the target set point along the plateau portion of the linearization curve wherein no corrective measures are performed.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a flow chart illustrating the methodology of the present invention;

FIG. 2 illustrates a linearization curve employing the plateau portion according to the present invention;

FIG. 3 is a chart embodying the X and Y inputs of the linearization curve of FIG. 2;

DETAILED DESCRIPTION OF THE PREFERRED EMBODIMENT

Figure 4:
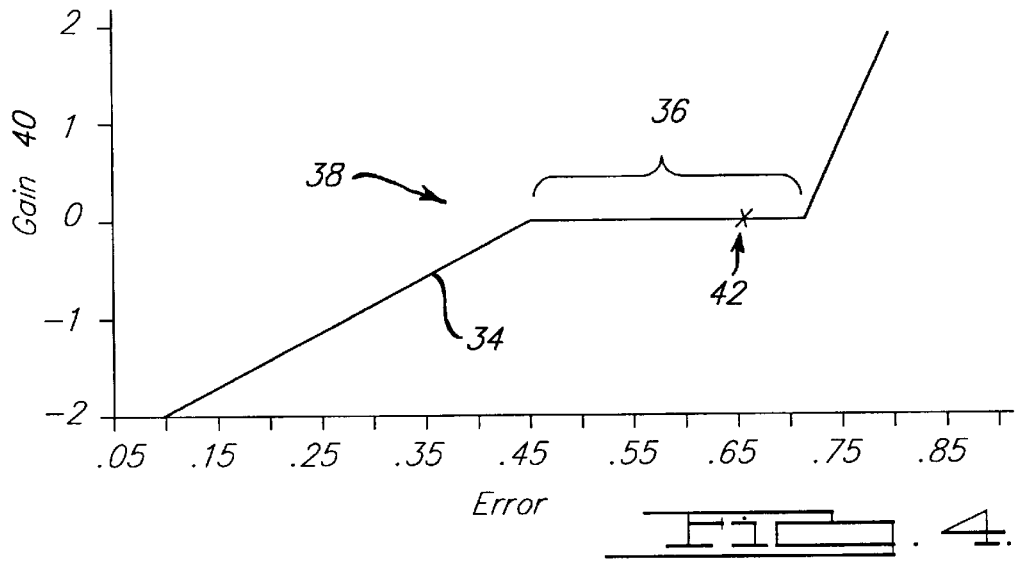
FIG. 4 illustrates a linearization curve for an oxygen sensor feedback system in accordance with the teachings of the present invention.

The present invention is directed towards a control system for controlling a component of a feedback system so as to force a measured output from the component to a desired set point. According to the present invention, aggressive corrective techniques are employed if the measure value is outside of a pre-determined range from the target set point. As the measured value approaches the target set point, the magnitude of the corrective measures is reduced to avoid over-shooting of the target set point and to minimize fluctuations therearound. When the measured valve is sufficiently close to the set point, no corrective measures are implemented.

Turning now to the drawing figures, FIG. 1 illustrates a flow chart of the methodology of the present invention. The methodology starts at bubble 10 and falls through to block 12. In block 12 the methodology acquires a measured value from the system into which the present invention is incorporated. For instance, the measured value could be the voltage from an oxygen sensor corresponding to the level of emissions in an automotive exhaust system or the RPM of a toothed wheel coupled to a crankshaft indicative of the idle speed of the engine.

From block 12, the methodology continues to block 14 where the measured value is compared to a desired set point value. The set point is selected from theoretical and experimental data and corresponds to the peak level of performance of the system. The comparison at block 14 yields an error value between the measured value and the desired set point. The methodology continues from block 14 to block 16 where a correction gain is determined according to the error computed at block 14. As will be described in greater detail below, the magnitude of the correction gain is dependent upon the size of the error.

From block 16, the methodology continues to block 18 where the correction gain is applied to a component of the system which controls (i.e., changes) the measured value retrieved at block 12. For example, the controller at block 18 may require a change in the fuel-to-air ratio of the automotive vehicle engine to change the constituent levels in the emissions detected by the oxygen sensor. This changes the voltage measured at block 12. Similarly, the controller at block 18 may open the idle air control valve to change the RPM of the crankshaft to yield better idle quality. This changes the RPM measured at block 12. From block 18, the methodology continues to bubble 20 where it is returned to bubble 12 to continuously update the system.

Turning now to FIG. 2, an exemplary linearization curve 22 is illustrated for determining the magnitude of the corrective gain 24 in accordance with the determined error 26 as described above. As can be seen, the magnitude of the corrective gain 24 is reduced as the measured value 28 approaches the target set point 30. When the error value 26 is sufficiently close to the target set point 28 (i.e., within an acceptable tolerance 32), no corrective gain 24 is implemented. The amount of tolerance 32 established for preventing corrective gain 24 is determined on a case by case basis according to the particular application into which the present invention is employed. Generally, the size of the tolerance 32 corresponds to an acceptable range of performance for the operating system, e.g., a range of emissions levels or RPMs. The exact shape of the linearization curve 22 will depend on vehicle to vehicle variability as well as component to component variability of the application into which the present invention is implemented.

Referring now to FIG. 3, the X and Y inputs of FIG. 2 are enumerated in chart form. Although merely exemplary, if the measured value 28 falls within the error range of −0.25 to 0.25 of the target set point 30, no corrective gain 24 is applied. However, as the measured value 28 falls farther and farther from the target set point 30, more aggressive corrective gain 24 is employed to rapidly change the system to the desired set point 30.

Turning now to FIG. 4, an exemplary use of the present invention will be described. As mentioned briefly above, the present invention may be employed in an oxygen sensor feedback control loop. As in known, in an oxygen sensor feedback system the output 34 of a downstream oxygen sensor in an automotive exhaust system is used to control the air-to-fuel ratio in the vehicle engine. The proper air-to-fuel ratio yields a properly operating catalyst such that the emissions from the vehicle engine are maintained within an acceptable range. Typically, the output 34 of the downstream oxygen sensor is fed to the engine controller which changes the air-to-fuel ratio delivered to the engine. The fuel-to-air ratio is monitored according to the feedback from an upstream oxygen sensor. The new fuel-to-air ratio changes the emissions output from the catalyst which is continuously monitored by the downstream oxygen sensor. The downstream oxygen sensor produces a voltage corresponding to the emissions constituents. By monitoring the voltage output 34 from the downstream oxygen sensor, the air-to-fuel ratio may be configured such that proper emissions are produced.

Oxygen sensors are known to be highly accurate at stoichiometry. However, very small deviations from stoichiometric conditions cause very large swings in the output voltage 34 of the oxygen sensor. Utilizing this change in voltage 34 from the oxygen sensor, corrective measures, such as a change in the fuel-to-air ratio, may be employed by the engine controller to return the system to stoichiometric. Even though the oxygen sensor is very sensitive to changes from the stoichiometric, there still exists a small range 36 on either end of stoichiometry (i.e., rich and lean) wherein the emissions are still acceptable and no corrective measures are necessary. Therefore, a plateau 36 is built into the linearization curve 38 so that no corrective gain 40 is called for so long as the voltage output 34 from the oxygen sensor falls within the plateau section 36. The linearization curve 38 for the oxygen sensor is determined by performing a fuel-to-air sweep on the oxygen sensor to yield a range of voltage outputs 34.

Oxygen sensors commonly employed in automotive exhaust systems have an acceptable output reliability between 0.1 and approximately 0.75 volts. Outside of this range, the oxygen sensor is regarded as unreliable. Therefore, if the measured value of the voltage 34 from the oxygen sensor is less than 0.1 volts or greater than 0.75 volts, aggressive corrective measures are implemented to change the fuel-to-air ratio such that the measured value 34 falls within the reliable range. Within the reliable range of the oxygen sensor, is another range wherein the output voltage from the oxygen sensor indicates that the emissions are acceptable without any correction. The plateau portion 36 of the linearization curve 38 corresponds to this range.

Thus, if the measured voltage 34 from the downstream oxygen sensor is between 0.1 and 0.75 volts, corrective measures are implemented to control the fuel-to-air ratio according to PID control. As the measured voltage output 34 approaches the target set point 42, smaller and smaller corrective measures 40 are employed using PID technology to correct the fuel-to-air ratio. Once the output voltage 34 of the downstream oxygen sensor falls within the plateau section 36 of the linearization curve, no corrective measures 40 are employed.

Figure 5:
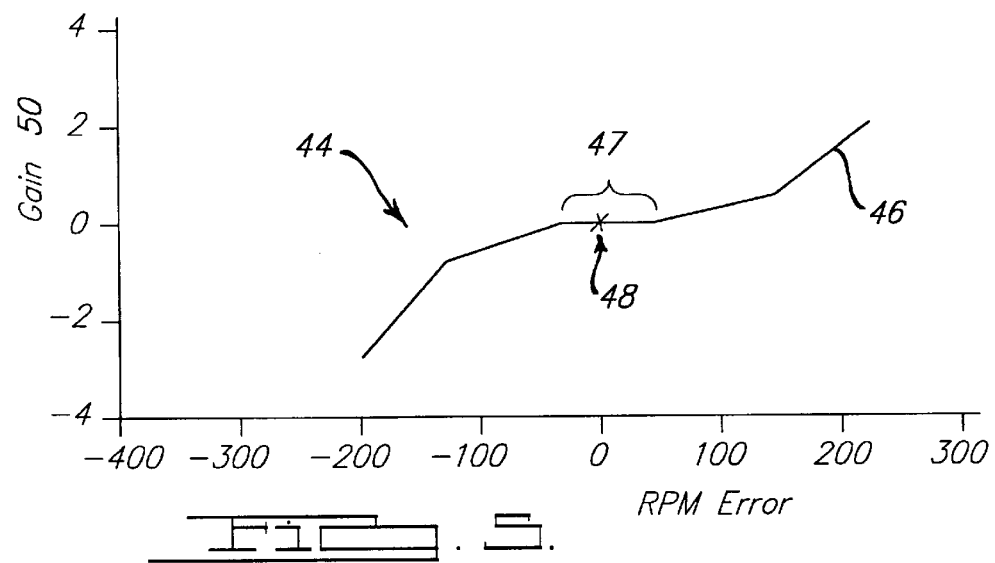
FIG. 5 illustrates a linearization curve for an idle RPM feedback control system in accordance with the teachings of the present invention.
Figure 6:
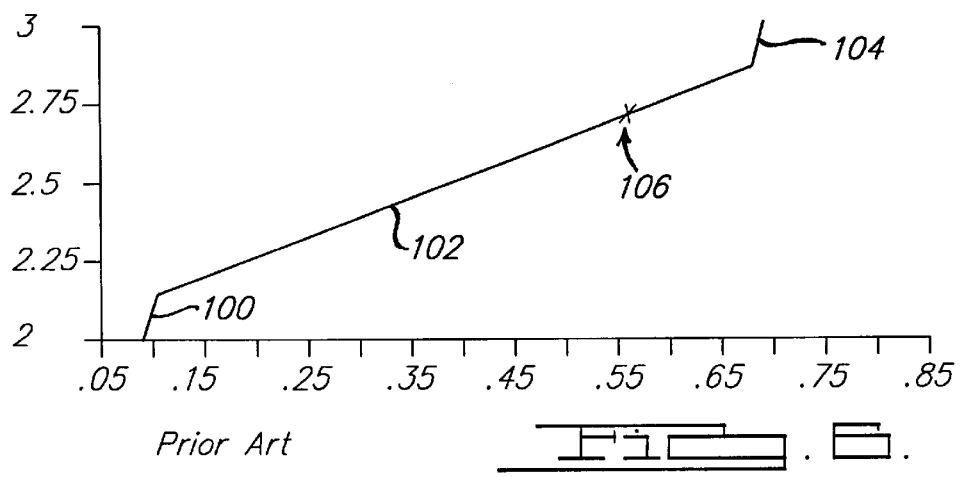
FIG. 6 illustrates a prior art linearization curve for an RPM feedback control system.

Turning now to FIG. 5, an exemplary idle RPM control linearization curve 44 is illustrated incorporating the teachings of the present invention. As with the oxygen sensor described above with reference to FIG. 4, an acceptable range of idle RPM is determined based on experimental testing outside of which aggressive corrective measures are implemented. The acceptable range of idle RPM varies from vehicle to vehicle as will be apparent to the skilled artisan. As with previous embodiments, as the measured idle RPM 46 gets closer and closer to the target idle RPM 48, less gain 50 is applied by the PID control. When the measured idle RPM 46 is within a given range 47 of the target idle RPM 48, no corrective measures 50 are employed.

It will be readily apparent to those skilled in the art that the PID constant values may be a wide range of numerical values depending on the desired gain of the feedback system. In response to the error value, the PID control calculates the fuel-to-air ratio, or idle air change (i.e., corrective measures) necessary to reduce the error to the target set point.

Thus, the present invention provides a method of driving a measured value to a target set point. More particularly, the present invention utilizes feedback from a system component to control the system according to the amount of error between the component output and the desired target set point. As the measured value approaches the target set point, smaller corrective gain is employed to avoid overshooting the target set point and to minimize fluctuation thereabout. Further, if the measured value is within an acceptable range of the target set point value, no corrective measures are applied.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of controlling a feedback system comprising:

obtaining a measured value from the feedback system;

comparing the measured value to a desired set point value to obtain an error;

withholding corrective measures if the error is within a given tolerance of the desired set point valve; and applying corrective measures to the system if the error is outside of the tolerance to vary the measured value, wherein the rate of change of the magnitude of the corrective measures increases as the magnitude of the error increases.

2. The method of claim 1 wherein said feedback system further comprises an oxygen sensor feedback based automotive exhaust control system.

3. The method of claim 2 wherein said measured value further comprises a voltage output of a downstream oxygen sensor of said automotive exhaust control system.

4. The method of claim 3 wherein said desired set point value further comprises a voltage level of said downstream oxygen sensor corresponding with optimum levels of exhaust emissions.

5. The method of claim 2 wherein said corrective measures further comprise changing an air-to-fuel ratio delivered to an engine of a vehicle in which said automotive exhaust control system is implemented.

6. The method of claim 1 wherein said feed back system further comprises a crankshaft speed feedback based idle RPM control system.

7. The method of claim 6 wherein said measured value further comprises a velocity of a toothed wheel of said idle RPM control system.

8. The method of claim 7 wherein said desired set point value further comprises a velocity of said toothed wheel corresponding to an optimum level of idle RPM.

9. The method of claim 6 wherein said corrective measures further comprise changing an amount of idle air delivered to an engine of a vehicle in which said idle RPM control system is implemented.

10. A method of controlling a feedback system comprising:

obtaining feedback information from the system;

comparing said feedback information to a desired set point; and varying operating parameters of a component of said system to change said measured value to said target set point if said feedback variation is outside of a given tolerance of said desired set point, wherein the rate of change of the magnitude of the variation of said operating parameters corresponds to the magnitude of the difference between said measured value and said desired set point.

11. The method of claim 10 wherein said feedback information further comprises a voltage output of a downstream oxygen sensor in an automotive exhaust control system.

12. The method of claim 11 wherein said desired set point further comprises a voltage level of said downstream oxygen sensor corresponding to an optimum level of exhaust emissions.

13. The method of claim 11 wherein said operating parameters further comprise an air-to-fuel ratio delivered to an engine of a vehicle in which said automotive exhaust control system is implemented.

14. The method of claim 10 wherein said feed back information further comprises a velocity of a toothed wheel of an idle RPM control system.

15. The method of claim 14 wherein said desired set point further comprises a velocity level of said toothed wheel corresponding to an optimum level of idle RPM.

16. The method of claim 14 wherein said corrective measures further comprise changing an amount of idle air delivered to an engine of a vehicle in which said idle RPM control system is implemented.

* * * * *